(12) United States Patent
Radulescu et al.

(10) Patent No.: US 8,621,128 B2
(45) Date of Patent: Dec. 31, 2013

(54) METHODS AND SYSTEMS FOR RELIABLE LINK STARTUP

(75) Inventors: Andrei Radulescu, Eindhoven (NL);
Peter Van Den Hamer, Waalre (NL);
Bipin Balakrishnan, Eindhoven (NL)

(73) Assignee: ST-Ericsson SA, Plan-les-Ouates (CH)

( * ) Notice: Subject to any disclaimer, the term of this patent is extended or adjusted under 35 U.S.C. 154(b) by 689 days.

(21) Appl. No.: 12/696,657

(22) Filed: Jan. 29, 2010

(65) Prior Publication Data
US 2011/0138096 A1 Jun. 9, 2011

Related U.S. Application Data

(60) Provisional application No. 61/266,759, filed on Dec. 4, 2009.

(51) Int. Cl.
*G06F 13/40* (2006.01)

(52) U.S. Cl.
USPC .......................... 710/307; 370/437

(58) Field of Classification Search
USPC .................. 710/305–307; 370/437
See application file for complete search history.

(56) References Cited

U.S. PATENT DOCUMENTS

| 7,415,032 B2* | 8/2008 | Drottar et al. ............... 370/437 |
| 2005/0160212 A1 | 7/2005 | Caruk |
| 2007/0133311 A1 | 6/2007 | Kim et al. |

OTHER PUBLICATIONS

International Search Report issued in corresponding international application No. PCT/EP2010/068013 and mailed on Mar. 23, 2011.
Written Opinion issued in corresponding international application No. PCT/EP2010/068013 and mailed on Mar. 23, 2011.
Galataki, Despo, "Design & Verification of UniPro Protocols for Mobile Phones," Vrije Universiteit (VU), Amsterdam, The Netherlands, Jul. 2009.
Radulescu, Andrei, "UniPro v1.4 M-PHY multi-lane," MIPI Alliance Confidential, Mobile Industry Processor Interface, Sep. 2009.
PCI Express, "Base Specification," Revision 2.1, Beaverton, Oregon, USA, Mar. 4, 2009.
RapidIO Trade Association, "RapidIO Interconnect Specification Annex 1: Software/System Bring Up Specification", Revision 2.1, Austin, TX, USA, Aug. 2009.
HyperTransport Technology Consortium, "HyperTransport I/O Link Specification," Revision 3.10b, Document No. HTC20051222-0046-0033, Sunnyvale, CA, Jun. 1, 2009.

* cited by examiner

*Primary Examiner* — Clifford Knoll
(74) *Attorney, Agent, or Firm* — Patent Portfolio Builders PLLC

(57) ABSTRACT

Link startup systems, methods and devices associated with interconnects are described. Asymmetric lane connections are supported by, for example, independent renumbering of the connected lanes after an initial discovery process. Low-power, hibernating states of devices are supported by, for example, initialing alternating between transmission of startup and wakeup sequences over the interconnect between devices.

30 Claims, 8 Drawing Sheets

METHODS AND SYSTEMS FOR RELIABLE LINK STARTUP

RELATED APPLICATION

This application is related to, and claims priority from, U.S. Provisional Patent Application Ser. No. 61/266,759, entitled "Reliable Link Startup", filed on Dec. 4, 2009, the disclosure of which is incorporated here by reference.

TECHNICAL FIELD

The present invention relates generally to digital circuits and more specifically to link startup systems and methods associated with interconnects.

BACKGROUND

Electronic devices, such as mobile phones, personal computers, personal digital assistants, and many others, utilize processors, memories, input/output (I/O) and other digital devices in order to provide their designed functionality to end users. These various digital devices are connected to one another using interconnects (also sometimes referred to as "busses"), which convey data, signals and commands between or among the various devices. When one device begins to transmit such data, signals and commands (herein sometimes referred to generically as "data") to another device over the interconnect, a link startup process is used to transition the two devices from their initially uncommunicative state to a state in which they are actively communicating with one another over the then setup link. Link startup processes, as with other processes performed over such interconnects, are sometimes defined by one or more standards which are promulgated to specify interconnects.

For example, in the Mobile Industry Processor Interface Alliance (MIPI), several standards are defined. One of these standards is called UniPro (Unified Protocol), which is aimed at chip-to-chip networks using high-speed serial links. UniPro is defined to be a general purpose protocol that solves the general interconnect problems, such as error handling, flow control, routing or arbitration. UniPro is intended to increase the flexibility of phone manufacturers by mixing and matching chips with different functionalities, potentially from different vendors for easy creation of new devices.

UniPro currently supports D-PHY links, which are high-speed, serial, low-power PHY links using separate clock and data lanes. Starting from version 1.40, UniPro will offer M-PHY support, which further embeds the clock in the data lanes. M-PHY will offer two transmission modes: low speed and high speed, each supporting multiple speed gears, and will also support several power-save states: STALL for the high-speed mode, SLEEP for the low-speed mode, and HIBERN8. STALL and SLEEP are optimized for a quick wakeup in their respective transmission modes, whereas HIBERN8 is a very low-power mode, which has a longer wakeup time. M-PHY is also defined to support optical links. In this document, a UniPro and PHY combination is called a UniPort, which has two flavours: UniPort-D and UniPort-M for D-PHY and M-PHY, respectively.

M-PHY in UniPro will differ from other existing high-speed, embedded-clock PHYs used in interconnects, such as those defined in standards commonly referred to as PCI Express, RapidIO and HyperTransport, as it is optimized for low power. Even though PCI Express, RapidIO and Hyper-Transport have power-save states, they only have one transmission mode, as opposed to M-PHY, which will have high-speed (also higher power) and low-speed (also lower-power) transmission modes. This makes the M-PHY control in UniPro more complex, as all of the states needed to support two transmission modes have to be managed. To understand better the challenge associated with link startup in UniPro based interconnects, a discussion of link startup in PCI Express, RapidIO and HyperTransport will now be provided.

For example, PCI Express uses a serial embedded-clock PHY that transfers data at potentially multiple speeds, and has power save states. PCI Express starts operating in its lowest transmission mode, i.e., at 2.5 GHz, and supports links up to 32 lanes, in powers of two. Both directions of the link have the same number of lanes, numbered identically, and all lanes always have the same power and transmission speed. The link startup in PCI Express is called "Link Training", and consists of 3 states: (1) the Detect State, in which a PCI Express port detects the presence of a peer port and the number of connected lanes (this is done by the Tx electrically detecting the presence of a termination impedance, which implies a peer Rx), (2) the Polling State, in which the two ends of a link use handshakes to determine their maximum common speed and detect the correct signal polarity, and (3) the Config State, in which the number of links (in the case of a downstream port) and the number of lanes and lane numbering (for both downstream and upstream ports) are determined (this is done by the upstream device (using its downstream port) iteratively sending training sequence ordered sets (TS1 OS), which are responded to by the downstream device which receives a TS1 OS with a Lane 0 label). At each iteration, the upstream device renumbers its downstream lanes based on the information it received from its peer downstream devices, such that, in the end, all downstream devices will be given a set of lanes numbered consecutively starting with 0.

However, the UniPort-M link startup process will need to differ from the PCI Express Link Training in that, among other things, the detection step cannot be performed electrically, because the UniPort-M's initial transmission mode uses the low power transmission mode, which has no termination impedance. As a result, as opposed to PCI Express, UniPort-M's lane detection should be performed using a protocol rather than electrical detection. Additionally, unlike PCI Express, the M-PHY of UniPro will start in the HIBERN8 power-save state, and needs to be configured to transition to a transmission mode. Additionally, UniPorts will be more flexible in the manner in which the lanes are interconnected since UniPro will support asymmetrical links (i.e., different number of lanes in the two directions). Accordingly, the link startup protocol of PCI Express is not suitable for link start up of M-PHY links in UniPro.

Turning now to Serial RapidIO, also sometimes referred to as RapidIO in this document, this bus standard supports an embedded-clock PHY that transfers data at potentially multiple speeds. No power save state is specified. If baud rate discovery is supported, RapidIO starts transmitting data at its highest supported speed. The node which detects a lower incoming data transmission will lower its transmission rate until both nodes have the same transmission rate. RapidIO supports up to 16 lanes, in powers of two. Both directions of the link have the same number of lanes, numbered identically, and all lanes always have the same power and transmission speed.

A multi-lane RapidIO link startup process, called the "port initialization process", consists of four or more secondary state machines, specifically:

(1) the Lane Synchronization state machine is used by each lane individually to achieve bit and symbol synchronization at the Rx side by counting comma and valid symbols up to 127 and Vmin, respectively;

(2) the Lane Alignment state machine is used for a multi-lane link to achieve Rx lane alignment by monitoring PHY symbol patterns to detect and eliminate inter-lane skew;

(3) the 1×/2×_Mode_Detect state machine is a RapidIO specific step that detects whether a 2× link is used in a 1× mode (using one lane for data and one lane for redundancy, the redundancy lane is used by RapidIO to transmit data of a lane which is physically broken, and still offer a lower-speed connectivity if such faults occur) or a 2× mode (using both lanes for data); and (4) the 1×/N× Initialization state machine starts with detecting a peer device by exchanging idle sequences on lanes 0 and 2. After a peer device is detected, the idle sequences are sent on all N lanes. If the peer device responds on all N lanes, the device enters the N× transmission mode, where all lanes are used. If not all incoming lanes carry data, one lane is used: either lane 0, if usable, or the redundancy lane if lane 0 is not useable. If more than one multi-lane transmission mode is supported, link width negotiation is used to select the greatest link width supported by both endpoints.

In contrast to RapidIO, and as mentioned previously, Uni-Port-M will start in a HIBERN8 state. Additionally, UniPorts are more flexible in the manner in which the lanes are interconnected since UniPro will support asymmetrical links (i.e., different number of lanes in the two directions). Accordingly, the link startup protocol of RapidIO is also not suitable for M-PHY in UniPro.

Turning thirdly to the bus standard known as HyperTransport Gen3, also sometimes referred to as HyperTransport in this document, this bus standard uses an embedded-clock PHY that offers data transmission at potentially multiple speeds, and has power save states. HyperTransport supports links with up to 32 lanes in powers of two. The link width is auto-negotiated. The lanes on both directions are statically numbered. The two link directions can be configured by software to have different widths.

A characteristic of HyperTransport is the use of CTL (control) lanes in addition to the usual CAD (clock & data) lanes. CTL lanes are used to indicate when control packets are transmitted and to improve the link robustness to transmission errors. Given the presence of CTL lanes, HyperTransport does not use the 8b10b K-codes, which are normally used for control, except for link training A multi-lane HyperTransport link startup, called Initialization, first electrically detects the peer device, then uses the 1200 MHz transmission mode for a series of Training 0-3 phases which use Training Patterns to establish bit and byte synchronization. The speed is not negotiated, but can be configured using software later. The link width is negotiated up to 8 lanes. The lane width can be configured via software, including using 16 or 32 lanes if that's supported by the 2 devices. Also asymmetrical link usages are possible through software. HyperTransport does not enumerate lanes.

Again, unlike HyperTransport, UniPort-M devices start in a HIBERN8 state. Additionally, unlike HyperTransport, UniPro will support automatic lane enumeration to ease chip-to-chip interconnect layout. Accordingly, the link startup protocol of HyperTransport is also not suitable for M-PHY in UniPro.

Accordingly, it would be desirable to provide methods, nodes and systems for interconnect link startup, e.g., for M-PHY links in UniPro systems.

SUMMARY

According to one exemplary embodiment, a method for link startup for a device having a first number of transmit lanes and a second number of receive lanes includes the steps of: establishing data communication through at least one of the first number of transmit lanes and at least one of the second number of receive lanes, determining a number of connected transmit lanes, determining a number of connected receive lanes, and independently renumbering the connected transmit lanes and the connected receive lanes.

According to another exemplary embodiment, a device includes an interface configured to transmit and receive data toward and from lanes of an interconnect, the interface including a transmitter having a plurality of transmit modules and a receiver having a plurality of receive modules, wherein the receiver is configured to determine a first number of lanes connected thereto for data reception as part of a link startup process and to store a first lane bit code associated with the determined first number of lanes, and further wherein the transmitter is configured to transmit the first lane bit code.

According to yet another exemplary embodiment, a method for link startup of an interconnect between a first device and a second device includes the steps of establishing data communication between the first device and second device over the interconnect, detecting a first number of connected lanes on the interconnect in a first transmit direction from the first device to the second device, detecting a second number of connected lanes on the interconnect in a second transmit direction from the second device to the first device, and independently renumbering the first number of connected lanes and the second number of connected lanes.

BRIEF DESCRIPTION OF THE DRAWINGS

The accompanying drawings illustrate exemplary embodiments, wherein.

ABBREVIATIONS AND ACRONYMS LIST

Figure 1:
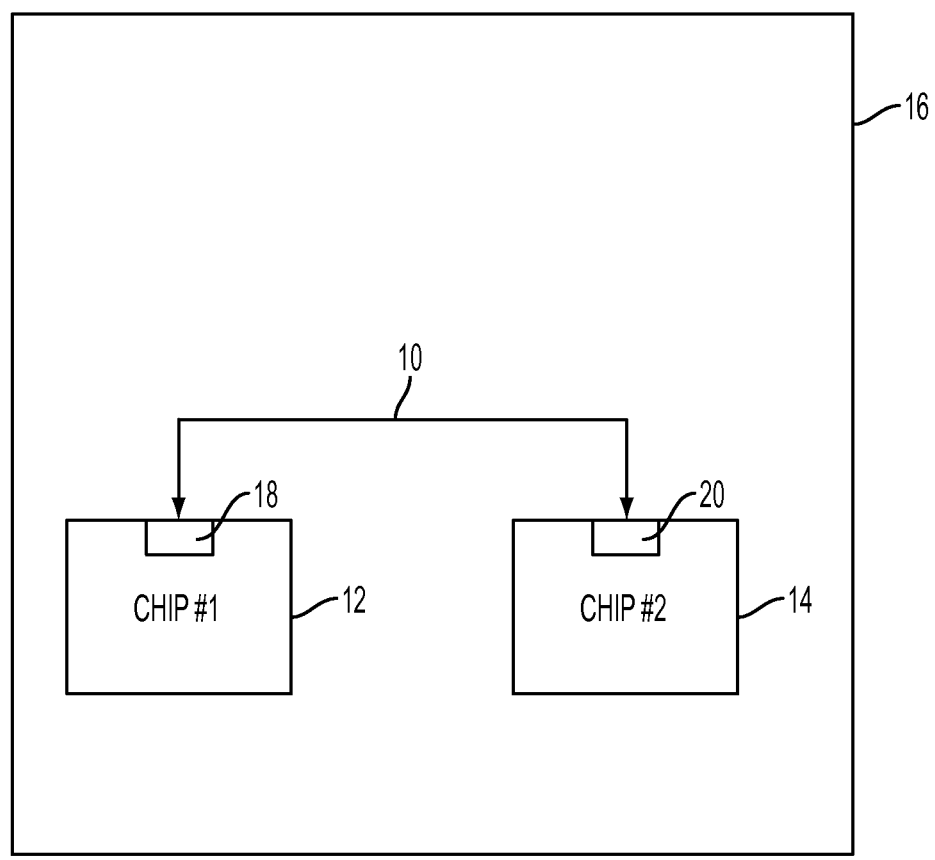
FIG. 1 is a high level block diagram depicting two devices which communicate via an interconnect and which can use link startup protocols according to these exemplary embodiments to establish a communication link therebetween.

CAD Clock & Data
CFG Configuration (also CONFIG)
CSI-3 Camera Serial Interface 3
CTL Control
DevA Device A
DevB Device B
DIF-N LINE state with negative differential voltage across the pins driven by M-TX
DIF-P LINE state with positive differential voltage across the pins driven by M-TX DIF-Z LINE state with high-impedance M-TX output while M-RX maintains a zero differential LINE voltage below the squelch threshold D-PHY 500-1000 Mbit/s PHY, named after the Roman number for 500 ("D")

FSM Finite State Machine

GBT GigaBit Trace

Gbps Gigabit per second

HIBERN8 Deepest low-power state without loss of configuration information

HS-BURST Transmission of payload data at high-speed (Gbps) in NRZ bit format and using 8b10b coding HS Mode High-Speed Mode JEDEC JEDEC Solid State Technology Association, formerly known as Joint Electron Device Engineering Council(s) (JEDEC), K-codes 8b10b control symbols LINE-CFG Line state to exchange configuration parameters with Media Converters LS Mode Low Speed Mode LCC (L)INE Control Command MARKER Non-data symbol, used for protocol related control purposes MC Media Converter MIPI Mobile Industry Processor Interface MODE-LCC MC control codes for state transitioning out of LINE-CFG M-PHY 1000+ Mbit/s PHY, named after the Roman number for 1000 ("M")

M-RX M-PHY electrical Receiver Module

M-TX M-PHY electrical Transmitter Module

NRZ-Line Non-return-to-zero differential point-to-point interconnect between PINS of M-TX and M-RX PHY PHYsical Layer POR Power-On Reset PWM Bit modulation scheme carrying the data information in the duty-cycle, and explicit clock information in the period PWM-GEAR Speed range communication in M-PHY's LS mode PWM-Line Interconnect carrying data using pulse width modulation PWM-G1 PWM-GEAR 1, the default M-PHY PWM-GEAR at start-up and after reset.

RAND Reasonable and Non Discriminatory Licensing

RCT Reconfiguration Trigger

Rx Receiver

SLEEP Power saving state used with PWM-Bursts and SYS-Bursts

STALL Power saving state between HS-Bursts with fast recovery time

TRG TRiGger

Tx Transmitter

UFS Universal Flash Storage

UniPort-M UniPro+M-PHY interface

UniPro Unified Protocol

UniPro WG UniPro Working Group

UPR UniPRo

DETAILED DESCRIPTION

The following detailed description of the exemplary embodiments refers to the accompanying drawings. The same reference numbers in different drawings identify the same or similar elements. Also, the following detailed description does not limit the invention. Instead, the scope of the invention is defined by the appended claims.

According to exemplary embodiments, a protocol for link startup, e.g., for M-PHY links, is described. Compared to other link startup mechanisms, such as those described above which are associated with PCI Express, RapidIO and HyperTransport, link startup mechanisms according to exemplary embodiments are also capable of supporting asymmetrical links (e.g., different number of lanes in the two directions), and allow flexibility in how lanes between two ports are connected. In order to provide some context for discussion of the exemplary embodiments, some information is first provided about UniPro protocols and systems in which these exemplary embodiments can be used. However it will be understood by those skilled in the art that exemplary embodiments of the present invention include, but are not limited to, usage in UniPro standardized systems.

As generally shown in FIG. 1, a UniPro interconnect 10 can, for example, be used to connect groups, (e.g., pairs or other multiples up to 128) of devices (e.g., chips 12 and 14) within composite device or system 16, such as a mobile phone. Data packets which are conveyed over the interconnect or link 10 from, e.g., chip 12 to chip 14, can subsequently be routed to other destination chips or modules within the composite device 16 using a UniPro switch (not shown in FIG. 1). The devices 12 and 14 will, in this exemplary embodiment, each include a UniPro+M-PHY interface 18 and 20, also called a UniPort-M, and interconnect 10 can be implemented using a bidirectional dual simplex link, i.e., a link having one or more unidirectional PHY lanes in both directions. UniPorts-M 18 and 20 allow up to four lanes per direction, with each lane in a single direction having the same power and speed capabilities; however, the two directions of the link can have different capabilities. In this context, a "lane" can be considered to be a point-to-point, serial link operating in one transmit direction.

Among other things, UniPorts-M 18 and 20 differ from existing interconnect interfaces with respect to, among other things, the flexibility that they permit in creating and configuring a link 10. For example, UniPorts-M 18 and 20 supports asymmetrical links, as opposed to PCI Express, RapidIO and HyperTransport which require the two directions of the link to be fully symmetrical (i.e., both directions of the link have the same number of lanes). UniPorts-M 18 and 20 will also allow only some of its lanes to be connected and there are no restrictions on how the lanes are connected, since the lanes are renumbered during the link startup as will be described below. In this context, the term "connected", as it refers to lanes, means physically connected. For example, suppose that chip 12 is a chip that offers a UniPort-M 18 with four lanes but is used in a system 16 in which it is attached to a chip 14 with more limited connectivity, e.g., having only two receive lanes. As a result, two of the lanes available for chip 12 are intentionally left physically unconnected. Lanes may also be accidentally unconnected due to physical errors between chips (e.g., in the circuit board or flex foil).

UniPorts-M 18 and 20 also support asymmetrically configured links (e.g., the two directions of the links can be set in different power modes), as opposed to PCI Express, RapidIO and HyperTransport which require the two directions of the link to be in the same power mode. One challenge associated with the M-PHY physical layer used by the UniPorts-M 18 and 20 and interconnect 10 is, thus, how to define a link startup protocol for this link given these different features available for link connectivity between the devices 12 and 14

Figure 2:
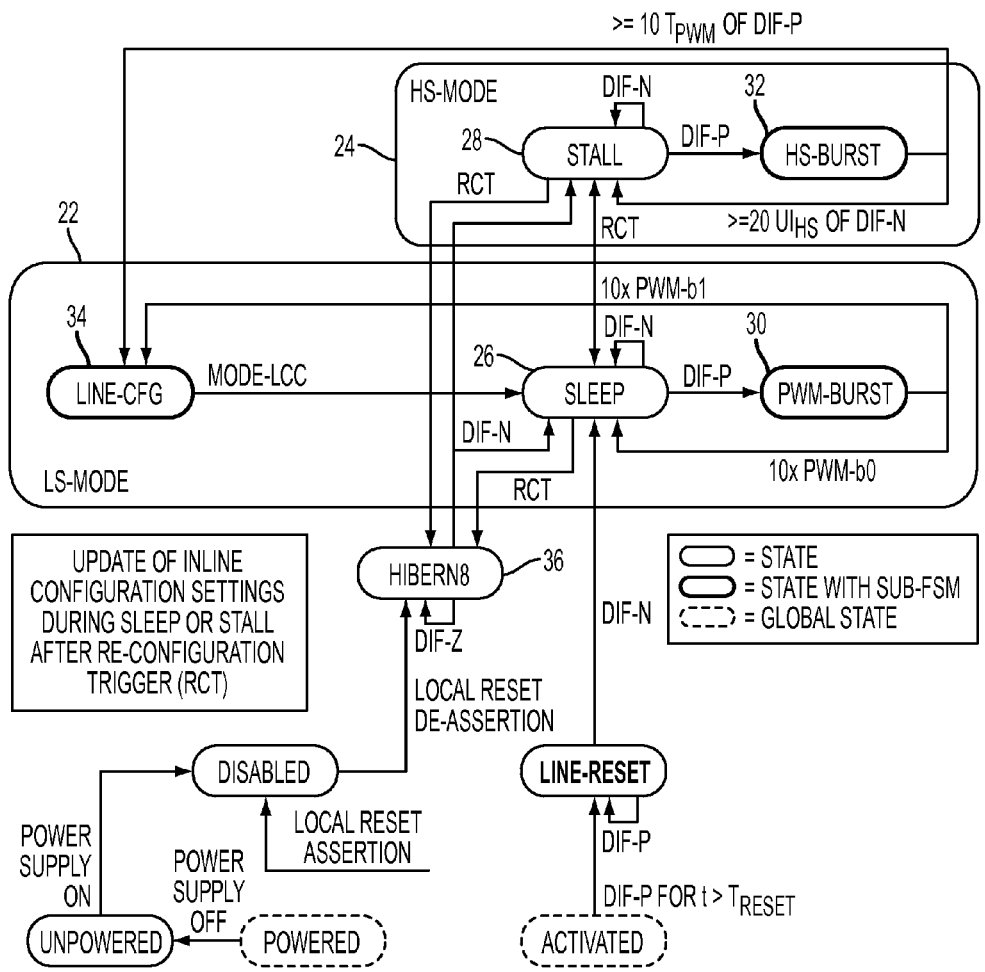
FIGS. 2 and 3 are state diagrams illustrating M-PHY transmit and receive states, respectively.
Figure 3:
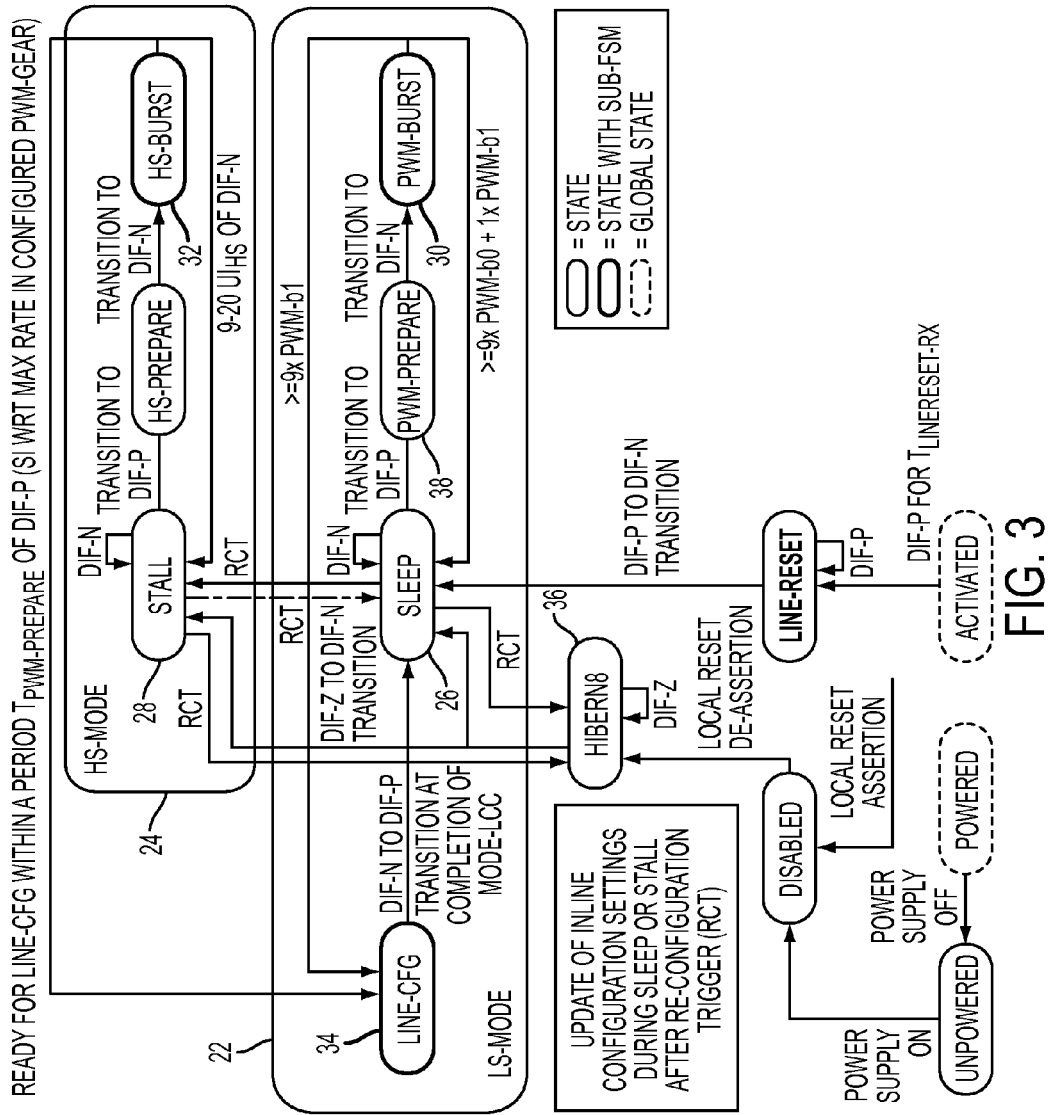

As can be seen in FIGS. 2 and 3, which illustrate the M-PHY transmit and receive states, respectively, the M-PHY of UniPro has 2 modes: LS-MODE (low speed) 22 and HS-MODE (high speed) 24. Each has a power-save mode:

SLEEP state 26 and STALL state 28, respectively, and a transmission mode: PWM-BURST state 30 and HS-BURST state 32, respectively. The LS-MODE 22 has an additional state, LINE-CFG state 34, which is used for configuring optical media converters, in case an optical link is used. HIBERN8 state 36 is a third ultra-low power-save state used for long idle times. The other states illustrated in FIGS. 2 and 3 are transitional, and/or of less significance for this description. According to UniPro, each transmission mode may have several transmission speeds. For example, LS-MODE 22 defines G0 to G7, and HS-MODE 24 defines G1 to G3, with the LS-MODE 22/G1 being used after reset of the interconnect 10 according to these exemplary embodiments.

M-PHY starts in the state HIBERN8 state 36 for both transmit and receive functions. Link startup is executed in LS-MODE 22/PWM-BURST 30/G1 according to these exemplary embodiments in order to avoid configuring the M-PHY or the media converters. Consequently, the M-PHY states used during link startup according to these exemplary embodiments are HIBERN8 state 36, SLEEP state 26, and PWM-BURST state 30 (with the PWM-PREPARE state 38 being a transitional state between SLEEP state 26 and PWM-BURST state 30 for M-PHY RX). If media convertors are used, and any transmission mode other than PWM/G1 is used, the media convertors will also need to be configured, and, hence, the LINE-CFG state will also be used.

A device, e.g., chip 12 or 14, requests its M-TX to exit the HIBERN8 state 36 by driving a DIF-N state to the lane for T_EXIT_HIBERNATE. Similarly, an M-RX exits the HIBERN8 state 36 when it detects a lane state transition from DIF-Z (i.e., the normal M-RX HIBERN8 state) to DIF-N. The HIBERN8 exit state is configurable and, as mentioned above, is set to LS-MODE 22 after reset according to this exemplary embodiment. In SLEEP state 26, as long as the M-TX drives DIF-N at M-TX, the link stays in SLEEP state 26. A device 12, 14 moves from SLEEP state 26 to PWM-BURST state 30 by driving DIF-P on the M-TX for a duration of T_PWM_PREPARE. An M-RX in SLEEP state 26 moves to PWM-PREPARE state 38 after it has seen a transition to DIF-P (which will be held for T_PWM_PREPARE), then it moves to PWM-BURST state 30 on a lane state transition to DIF-N. Exiting from PWM-BURST state 30 to SLEEP state 26 is performed by sending/receiving a burst of (e.g., at least 10) b0 PWM bits followed by a b1 PWM bit, e.g., from/by the interface 18 over interconnect 10. Exiting from PWM-BURST state 30 to the LINE_CFG state 34 is similarly done with a burst of b1 bits, but is not used by link startup according to these exemplary embodiments. Moving from the SLEEP state 26 to HIBERN8 state 36 is done by the protocol configuring the M-TX and M-RX modules, respectively, however, this function is also not needed by link startup.

Figure 4:
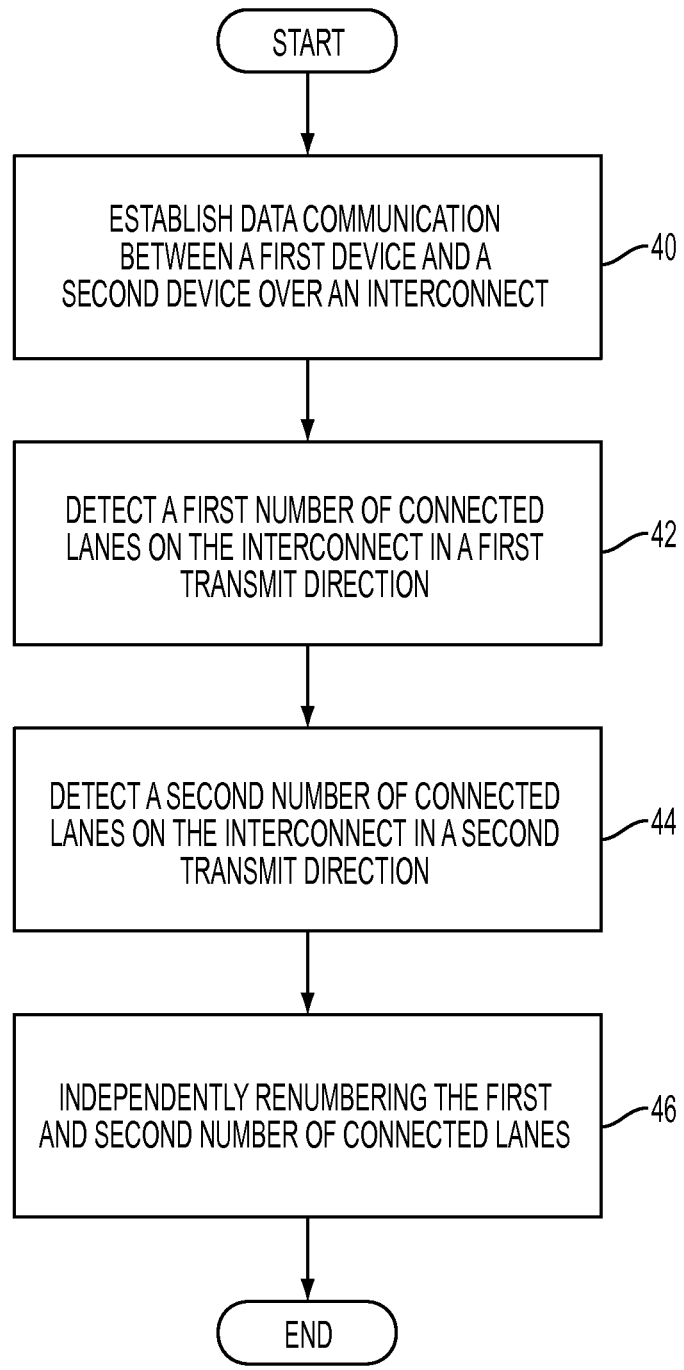
FIG. 4 is a flowchart depicting a method for link startup according to an exemplary embodiment.

Having provided some exemplary context for devices and links, the discussion now turns to startup of those links, e.g., when communications between two devices 12, 14 is initiated. According to exemplary embodiments, and as illustrated in the flowchart of FIG. 4, a method for link startup detects the presence of a peer device (step 40), establishes data communication (step 42), detects the number of connected lanes per direction (step 44), and enumerates the two sets of lanes in the two directions (46). These exemplary embodiments may be used in conjunction with link startup in interconnects which operate in accordance with the UniPro specification, e.g., for use in conjunction with M-PHY or D-PHY links in UniPro interconnects. Link startup according to exemplary embodiments need not perform capability discovery beyond the number of lanes (e.g., supported transmission modes and their gear speeds) which may be carried out as a subsequent step, and may be used to re-configure or de-link at a later stage. The link startup may, however, be extended to further collect capability properties from at least any present optical media convertors, and possibly auto-negotiate data transmission modes.

Among other features, link startup according to exemplary embodiments provide support for a non-transmitting, power-save state in the peer device which starts to receive data from a transmitting peer device. This is achieved by, for example, the Tx of one peer device 12, 14 alternating between transmitting startup symbols and wake up sequences to ensure that the other peer device 14, 12 is awake and able to detect the startup sequence.

Additionally, exemplary embodiments provide support for flexible link interconnectivity, in which any lane can be connected independently. Exemplary embodiments also automatically enumerate the connected lanes independently in each transmit direction, which offers flexibility in board and chip interconnect design and allows a maximum connectivity in case of physical broken lanes.

A link startup protocol according to an exemplary embodiment uses the M-PHY default transmission mode after reset: PWM-G1, and takes advantage of the 8b10b encoding used in the M-PHY. According to one exemplary embodiment, the link startup includes the following four phases which are also illustrated as a state machine in FIG. 5. Briefly, in Phase 0 50, the Tx configures the Tx to exit the HIBERN8 state to LS-MODE in the SLEEP state. In Phases 1a-1b 52-54, the Tx alternates between driving DIF-N for T_EXIT_HIBERNATE to wake up the Rx from the HIBERN8 state, and sending a TRG1_code announcing its physical lane numbering. The TRG1_code is used by the Rx to detect the number of connected lanes and learn about the Tx lane numbering. In Phases 2a-2b 56-58, the Rx communicates lane connection and the Tx/Rx aligns lane numbering to 0. In Phase 3 60, 62, the link startup is made robust to transmission errors. Phase 3 can for instance also be combined with collecting OMC capabilities by sending an LCC-Read. Each of these phases will now be described in more detail according to an exemplary embodiment wherein it is presumed that device 12 is initiating a link startup toward device 14, and that device 14 initiates a link startup toward device 12, and specific (but purely illustrative) examples of some phases will be shown with respect to FIGS. 7-11. FIG. 6 illustrates a generalized interconnect and interface structure which will be used (with slight variations, e.g., in the number of available/connected M-TX and M-RX modules) in the specific illustrative examples of FIGS. 7-11. Therein, device A 12 has four M-PHY transmit modules TX0-TX3 which are connected via individual, serial links to corresponding M-PHY receive modules RX0-RX4 in device B 14 for conveying data from device A 12 to device B 14 in a first transmit direction using from 1-4 data lanes. Device B 14 has two M-PHY transmit modules TX0-TX1 which are connected via individual, serial links to corresponding M-PHY receive modules RX0-RX1 in device B 14 for a conveying data from device B 14 to device A 12 in a second transmit direction. Collectively, these six serial links form interconnect 10, the four transmit modules and two receive modules associated with device A 12 form the interface 18 and the four receive modules and two transmit modules associated with device B 14 form interface 20 in this example.

Phase 0 50

The device 12 configures its M-TX (M-PHY transmitter) and M-RX (M-PHY receiver) modules for all lanes to move from hibernate (HIBERN8 state 36) into the low-speed mode (LS-MODE 22) in the manner described above. The actual HIBERN8 state 36 to the LS_MODE/SLEEP state 26 state transition occurs after the lanes are driven to the DIF-N state by the M-TX modules for T_EXIT_HIBERNATE.

Phase 1a 52

The Tx modules of device 12 repeatedly drive all the M-TX lanes through, for example, the following steps:

1a.1: All M-TX modules are simultaneously driven to the PWM-BURST state 30 (using the default G1 gear speed);

1a.2: The TRG_UPR1 training sequence is simultaneously sent on all M-TX modules of the lanes which are connected. The TRG_UPR1 training sequence can, for example, include: MARKER0 (K.28.5), which is required by M-PHY for initiating a transmission, MARKER1 (K.28.3), which pads to keep lanes 16-bit aligned, and distinguishes from the normal ESC_DL protocol usage of MARKER0, MARKER1 (K.28.3), which introduces a PHY Adapter 16-bit symbol, a data symbol carrying the 6-bit TRG1_code (6b'100000) followed by a 2-bit field indicating the physical Tx lane number (if up to 4 lanes are supported) which is the second byte of the PHY Adapter sequence, and communicates the physical M-TX lane number to the peer device 14, and MARKER2 (K.28.6) to end the transmission and request the M-TX lanes to move to the SLEEP power save state 26;

1a.3. All the M-TX modules are forced to SLEEP state 26 for at least T_EXIT_HIBERNATE (T_EXIT_HIBERNATE being defined by M-PHY). This forces the DIF-N state on the outgoing lanes for at least T_EXIT_HIBERNATE, which would move the peer M-RX modules to the LS_MODE/SLEEP state 26 if they were in the HIBERN8 state 36. This provides the afore-described alternating transmission of startup symbols and wake-up symbols according to exemplary embodiments.

The receiver, e.g. in device B 14, monitors its M-RX modules for input data. When the M-RX modules receive the first set of TRG_UPR1 training sequences, the device B 14 learns which of its M-RX lanes are connected, and their corresponding physical Tx lane numbers. Using the received, physical Tx lane numbers, the receiver creates a lane bit code, which sets a bit for each corresponding physical Tx lane number that it received. This lane bit code can, for example, be stored at the Rx module in flip-flops (FSM state information) or in an addressable scratchpad memory. As described below, this lane bit code will subsequently be used by each side of the link to independently enumerate (renumber) its connected lanes.

Figure 6:
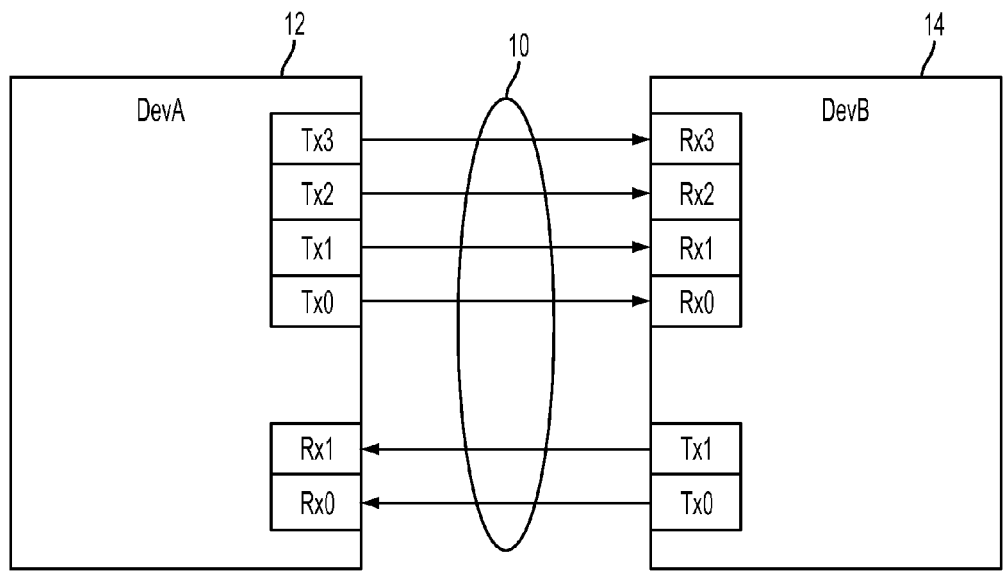
FIG. 6 shows two devices connected by an interconnect according to an exemplary embodiment.
Figure 7:
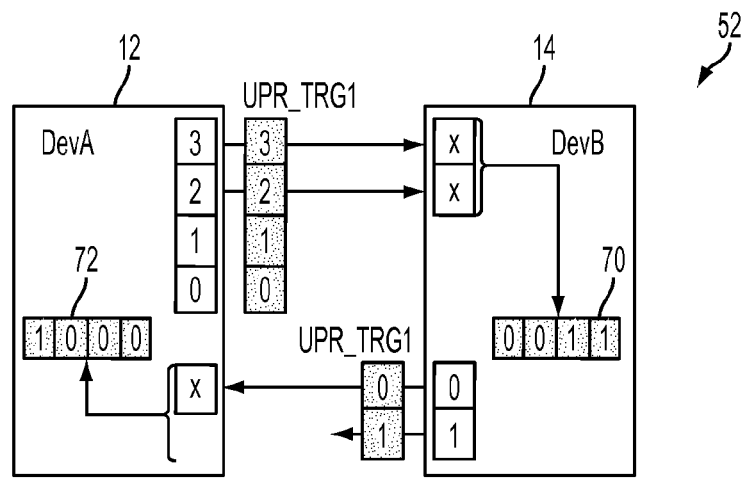
FIGS. 7-11 illustrate examples of various link startup phases according to exemplary embodiments.

An example of Phase 1a 52 of a link startup protocol according to these exemplary embodiments using the exemplary interconnect structure of FIG. 6 is illustrated in FIG. 7. Therein, DevA 12 has a four lane transmitter and sends TRG_UPR1 training sequences carrying lane numbers 0-3. Only Lanes 2 and 3 are connected at DevB 14, hence, DevB 14's receiver will create a lane bit code of 4b'0011 as shown in block 70. Similarly, DevB 14 has two outgoing lanes, however, only Lane 0 is connected. As a result, DevA 12's Rx will create a lane bit code of 4b'1000 as shown in block 72.

As shown in FIG. 7, each device uses the incoming physical Tx lane numbers to automatically enumerate (renumber) its own Rx lanes. The enumeration of M-RX lanes starts from 0 in the increasing order of the received physical Tx lanes. Thus, in this example, DevB 14 assigns lane numbers 0 and 1 to the lanes receiving physical lane numbers 2 and 3, respectively (as shown in FIG. 7). When sending/receiving data, the data symbols are mapped to/from the lanes based on their numbering: one symbol on Lane 0, next symbol on Lane 1, etc. for all lanes. When one or more of the M-PHY modules Rx of device A 12 and device B 14 receives a set of TRG_UPR1 training sequences, the device moves from Phase 1a 52 to Phase 1b 54 of the link startup process according to this exemplary embodiment.

Phase 1b 54

Figure 5:
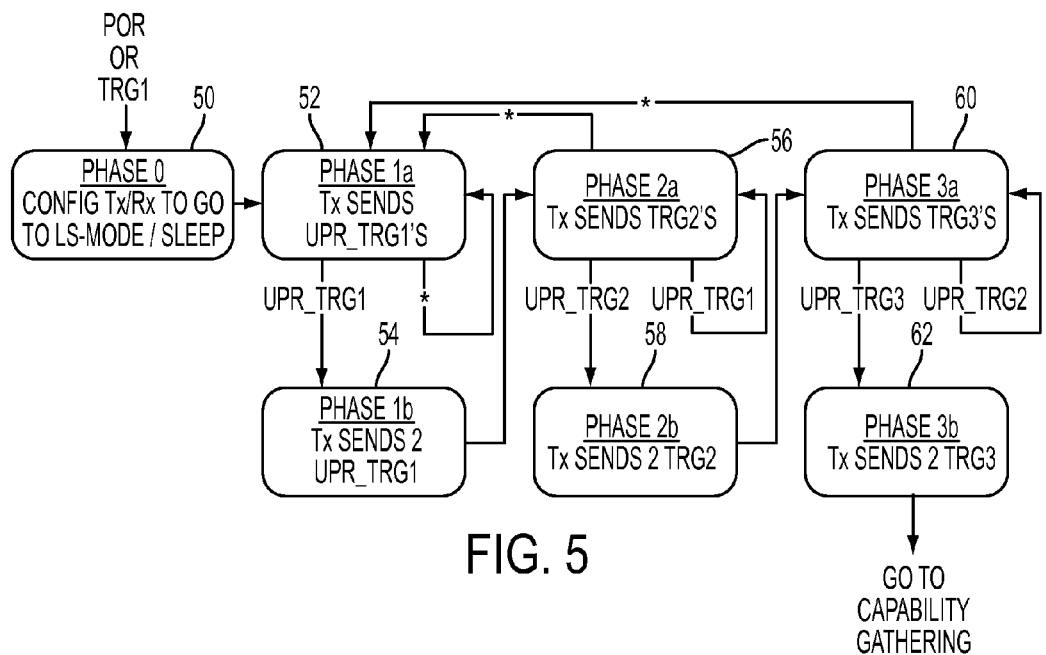
FIG. 5 depicts link startup phases according to an exemplary embodiment.

As shown in FIG. 5, in this phase, the Tx modules associated with device A 12 and device B 14 each simultaneously sends, on all M-TX lanes, two more TRG_UPR1 sequences, then the respective device moves to Phase 2a. Note that data transmission over the interconnect 10 is simultaneous (or substantially simultaneous) on all lanes in a given transmit direction, but may occur at different times per direction.

Phase 2a 56

Figure 8:
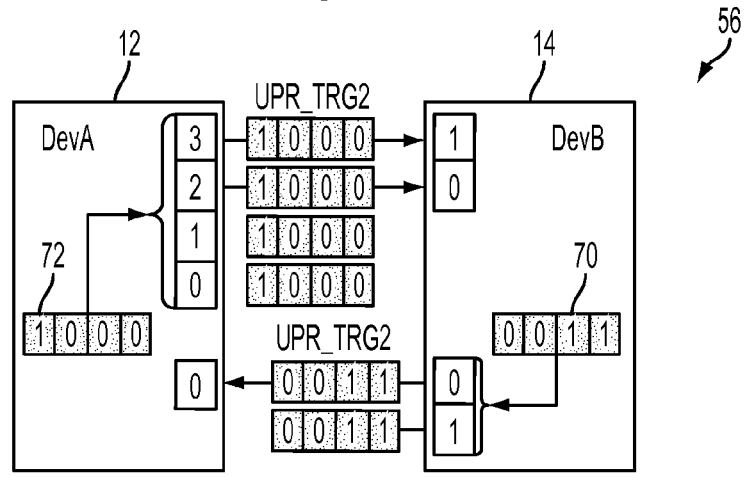

In this phase, the Tx modules of each device 12, 14 put all of the M-TX lanes into LS-MODE 22/PWM-BURST 30 (using the default G1 gear speed) and then sending the MARKER0 (K.28.5) and MARKER1 (K.28.3) sequence to achieve byte synchronization and start transmission. Then, the Tx simultaneously drives on all M-TX lanes TRG_UPR2 training sequences, which according to this exemplary embodiment includes: a MARKER1 (K.28.3), which introduces a PHY Adapter 16-bit symbol and a data symbol carrying the 4-bit TRG2 code (6b'1001) followed by the Rx 4-bit lane bit code. FIG. 8 illustrates an example of Phase 2a 56 including the transmission of the bit lane code as part of the TRG_UPR2 training sequence.

Figure 9:
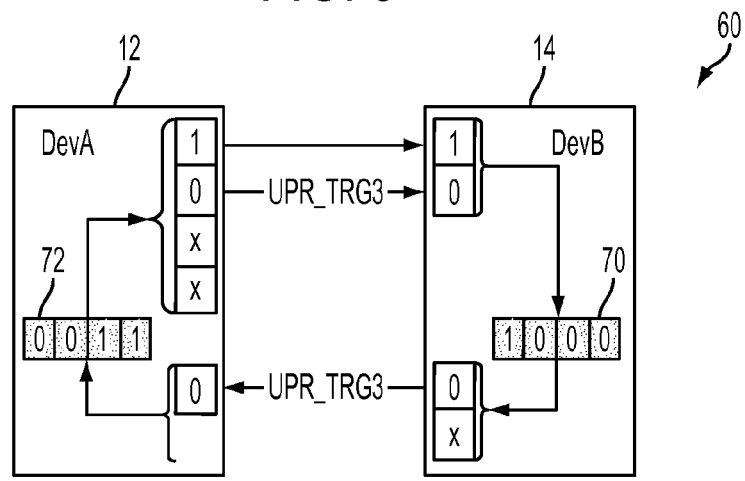

The received 4-bit lane code is used to re-number the Tx lanes starting from 0 in the increasing order of the physical Tx lanes. In this example, DevA 12, which received 4b'0011, learns that its M-TX Lanes 0 and 1 are not connected, and that its M-TX Lanes 2 and 3 are connected. The device 12 also re-numbers its M-TX Lanes 2 and 3 to 0 and 1, respectively, which renumbering can be seen by comparing the numbers associated with each Tx module in FIG. 8 with corresponding numbers as shown in FIG. 9. When receiving a set of TRG_UPR2 training sequences, the device moves to Phase 2b 58.

Phase 2b 58

As shown in FIG. 5, in this phase, the device's M-PHY Tx simultaneously sends on all M-TX lanes two more TRG_UPR2 sequences in LS-MODE 22/PWM-BURST 30/G1, then the device moves to Phase 3a 60. Again, note that data transmission over the interconnect 10 is simultaneous (or substantially simultaneous) on all lanes in a given transmit direction, but may occur at different times per direction.

Phase 3a 60

As illustrated in FIG. 9, the Tx repeatedly sends on Lane 0 TRG_UPR3 training sequences using LS-MODE 22/PWM-BURST 30/G1. This is performed in order to acknowledge that the TRG_UPR2 sequence was correctly received. A TRG_UPR3 training sequence, according to this exemplary embodiment, includes: a MARKER1 (K.28.3), which introduces a PHY Adapter 16-bit symbol, and a data symbol carrying the 8-bit TRG3 code (6b'10100000). Upon receiving the TRG_UPR3 training sequences, the device 12, 14 moves to Phase 3b 62.

Phase 3b 62

The Tx sends on Lane 0 two more TRG_UPR3 training sequences in LS-MODE/PWM-BURST/G1, then the device indicates that the link startup sequence has successfully completed.

As an alternative to Phases 3a 60 and 3b 62 in the above-described exemplary embodiment, TRG_UPR3 could be sent on all connected lanes instead of just Lane 0. In FIG. 9, this would result in DevA 12 sending TRG_UPR3 on its enumerated Lanes 0 and 1, and DevB 14 sending TRG_UPR3 on its enumerated Lane 0. For all Phases 1a 52, 2a 56 and 3a 60 of the link startup according to this exemplary embodiment, timers can be used to recover from errors. The Phase 1a 52 timer has a large value, and, if it expires stops the link startup with an indication that the UniPort is disconnected. The Phase 2a 56 and 3a 60 timers can use smaller values, and, if these timers expire, the link startup is stopped, with an indication of a permanent link failure. As an alternative to Phase 3a 60 and 3b 62 in the above-described exemplary embodiment, the TRG_UPR3 may also include a LCC-Read command to collect the OMC capabilities.

Figure 10:
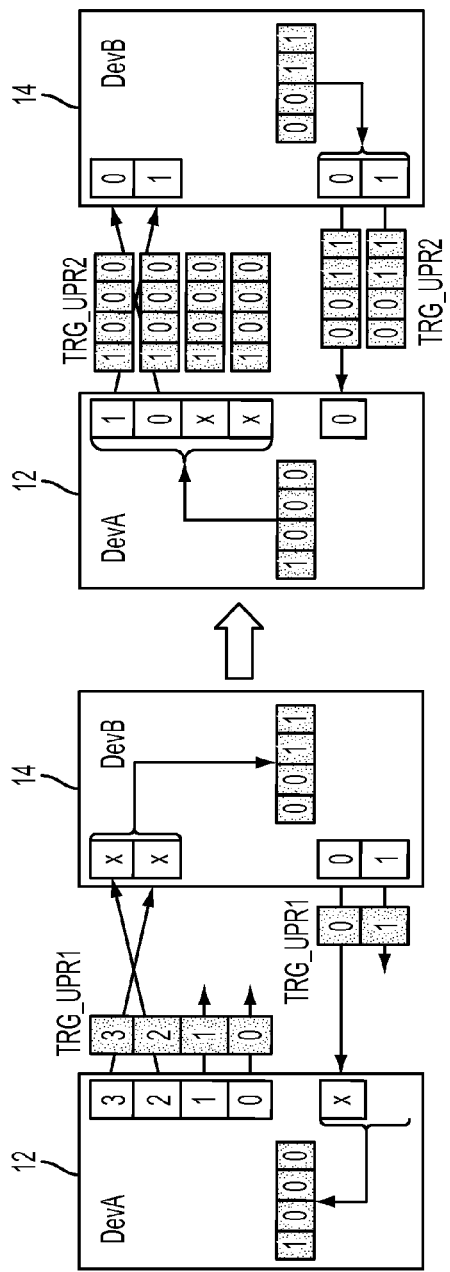

In FIG. 10, a second example of independent lane enumeration according to exemplary embodiments as part of the link startup process is illustrated, where DevA 12 has 4 Tx lanes and 1 Rx lane, and DevB 14 has 2 Tx lanes and 2 Rx lanes. In this example, the DevA 12 to DevB 14 direction has 2 crossed lanes, and the DevB 14 to DevA 12 direction has 1 lane. DevA 12 learns that DevB 14 only connects its Tx Lanes 2 and 3, and renumbers them as 0 and 1, respectively. These lanes are also numbered as 0 and 1 at DevB 14 despite them being crossed (compare with the renumbered lanes of Dev B 14 in FIG. 9). For the DevB 14 to DevA 12 direction, DevB 14 learns that its Tx Lane 0 is connected. This lane is numbered as 0 at both ends.

Figure 11:
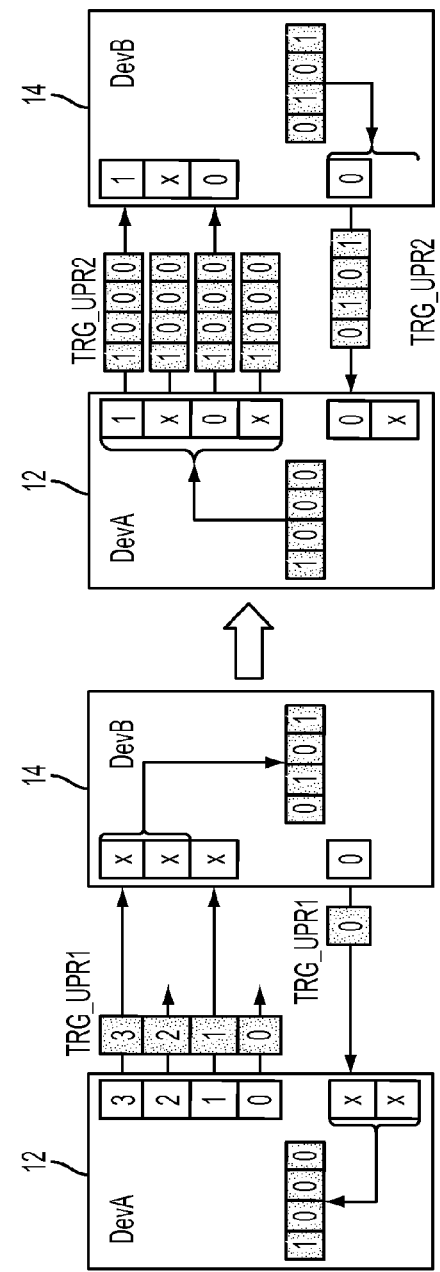

In FIG. 11, a third example of independent lane enumeration according to exemplary embodiments as part of the link startup process is illustrated, where DevA 12 has 4 Tx lanes and 2 Rx lanes, and DevB 14 has 1 Tx lane and 2 Rx lanes. In this example, the DevA 12 to DevB 14 direction has 2 lanes connected at DevA 12's physical Tx Lanes 1 and 3. The gap created by DevA 12's unconnected Lane 2 may be caused, for example, by a physically damaged lane. The DevB 14 to DevA 12 direction has 1 lane. DevB 14 learns that DevA 12 only connects its Tx Lanes 1 and 3, and renumbers them as 0 and 1, respectively. These lanes are also numbered as 0 and 1 at DevA 12. For the DevB 14 to DevA 12 direction, DevA 12 learns that its Tx Lane 0 is connected. This lane is numbered as 0 at both ends.

Among other features and advantages, some exemplary embodiments support a PHY that comes out of reset in a power-save state (i.e., a state which cannot be used for transmitting data) and activate the link for transmitting data. Additionally, exemplary embodiments support flexible lane interconnect and automatic lane enumeration. More specifically, such support can include one or more of: (1) a different number of lanes per direction, (2) a random subset of lanes being connected and/or (3) ability to connect the physical lanes of different devices in any order. Using automatic lane enumeration, exemplary embodiments are able to use the maximum capacity of a link which contains physically broken lanes.

Figure 12:
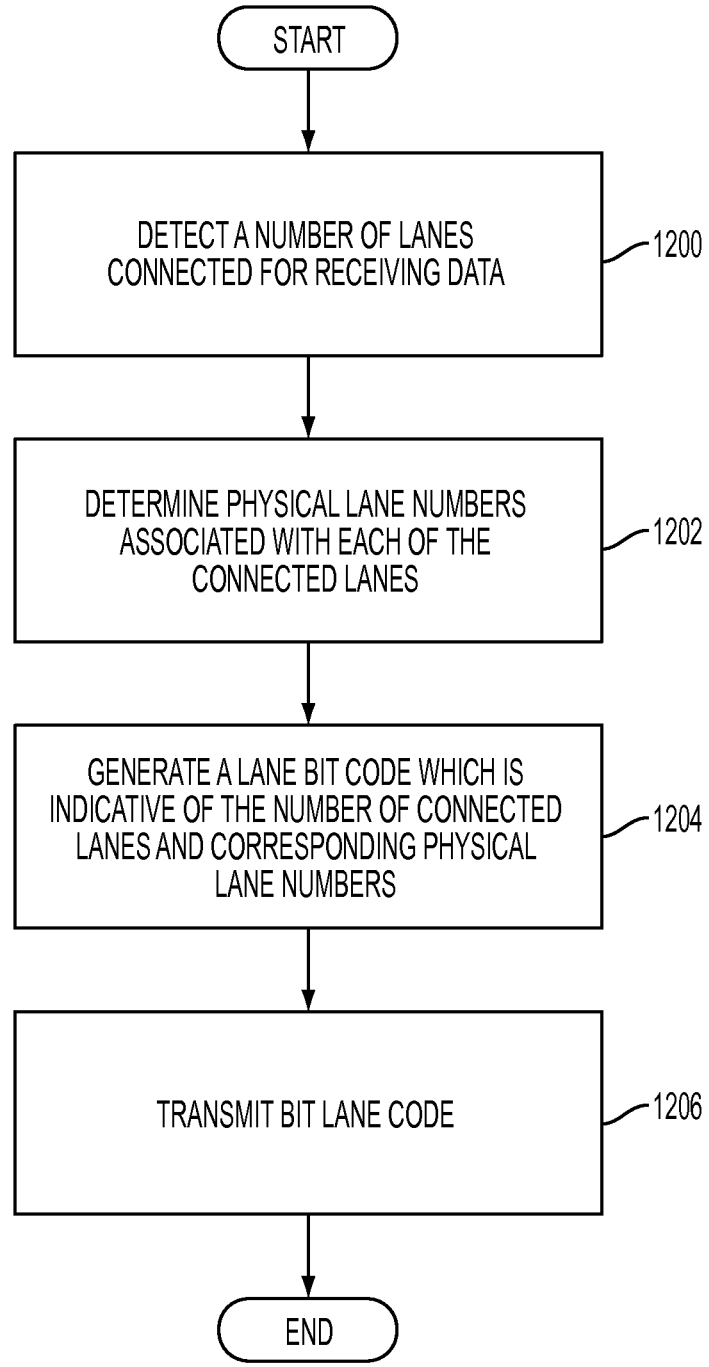
FIG. 12 is a flowchart illustrating a link startup method according to another exemplary embodiment.

Thus it will be appreciated that exemplary embodiments can also be described in terms of methods for link startup from the perspective of a single device as shown, for example, in the flowchart of FIG. 12. Therein, a method for link startup includes the step of detecting, by a device, a number of lanes which are connected on an interconnect for receiving data at step 1200. The device can determine, at step 1202, physical lane numbers (i.e., lane numbers nominally assigned from the transmit side) which are associated with each of the number of connected lanes. A lane bit code can be generated, at step 1204, which code is indicative of the number of connected lanes and corresponding physical lane numbers. This lane bit code can then be transmitted by the device, at step 1206, which code can be used by the other device on the link to renumber its lanes in the manner described above.

As mentioned earlier, exemplary embodiments can be used for link startup of interconnects which operate in accordance with UniPro standards, although the present invention is not limited thereto. Some of the distinguishing features of such UniPro standardized interconnects according to such exemplary embodiments include, for example:

UniPro links support multiple power modes, including HYBERNATE (very low power, no data transmission, long wakeup times), SLOW/LOW-SPEED (low speed, moderate power consumption), FAST/HIGH-SPEED (high speed, lowest energy per bit, consumes power when idling). The FAST and SLOW modes also have a SAVE mode (STALL and SLEEP, respectively) which has a low power consumption (higher than HIBERNATE), and a fast wakeup time (much lower than HIBERNATE);

UniPro links can be asymmetrical in the following aspects:
Number of connected lanes per direction (e.g., 1 lane in one direction, 2 lanes in the other direction). Number of lanes configured to be active.

Power/transmission mode and gear capabilities (LOW-SPEED (LS) only in one direction, LOW-SPEED and HIGH-SPEED (HS) in the other direction) and configurations (HS/GEAR 1 in one direction, HS/GEAR 3 in the other direction).

Transmitting data in one direction and being in a power-save state in the other (e.g., HS-BURST and SLEEP, respectively)

For HIBERNATE, however, the link shall be configured in HIBERNATE in both directions Connected lanes are automatically discovered and enumerated UniPro supports PHYs that need to be configured at both ends (such as M-PHY). Simpler PHYs can be configured at Tx only, but with more complex PHYs, such as M-PHY, the line states are not enough to encode all the possible changes.

UniPro provides support for links with discrete media converters (e.g., optical media converters). Discrete media converters can only be configured through the line (no direct access to registers is possible).

From the foregoing discussion, it will be appreciated that exemplary embodiments employ three different (first (e.g., containing TRG1), second (e.g., containing TRG2) and third (e.g., containing TRG3)) training sequences for link startup. These three training sequences can be used in various orders to achieve certain objectives according to exemplary embodiments. For example, the second training sequence can be sent after the first training sequence is received. Similarly, the third training sequence can be sent after receiving the second training sequence. To increase robustness, each training sequence can be sent twice more by a device after that device receives the corresponding training sequence from its linked pair, e.g., the first training sequence is sent repeatedly until a first raining sequence is received, and twice more after the first training sequence was received. According to one exemplary embodiment, only after this set of operations occurs with the first training sequence is the second training sequence sent. When expecting the first training sequence, everything else can be ignored according to exemplary embodiments. When expecting the second training sequence, the first training sequence can be ignored, and anything else other than first and second training sequence makes a device expect a first training sequence again according to exemplary embodiments. When expecting the third training sequence, the second training sequence can be ignored, and anything else other than second and third training sequence makes a device expect a first training sequence again according to exemplary embodiments.

The above-described exemplary embodiments are intended to be illustrative in all respects, rather than restrictive, of the present invention. Thus the present invention is capable of many variations in detailed implementation that can be derived from the description contained herein by a person skilled in the art. No element, act, or instruction used in the description of the present application should be construed as critical or essential to the invention unless explicitly described as such. Also, as used herein, the article "a" is intended to include one or more items.

The invention claimed is:

1. A method for link startup for a device having a number of transmit lanes and a number of receive lanes comprising:
    establishing data communication through at least one of said number of transmit lanes and at least one of said number of receive lanes;
    determining a number of connected transmit lanes;
    determining a number of connected receive lanes; and
    independently renumbering said connected transmit lanes and said connected receive lanes.

2. The method of claim 1, wherein the number of transmit lanes is different than the number of receive lanes.

3. The method of claim 1, wherein the number of connected transmit lanes is different than the number of connected receive lanes.

4. The device of claim 1, wherein a subset of at least one of the number of transmit lanes and the number of receive lanes are connected.

5. The method of claim 1, wherein the step of establishing communication through the at least one of the number of transmit lanes further comprises:
    sending, on each of said number of transmit lanes, a first training sequence carrying an identification of the respective physical transmit lane.

6. The method of claim 5, wherein the step of determining the number of connected transmit lanes further comprises:
    receiving a second training sequence which includes a code indicative of said number of connected transmit lanes and that identifies which transmit lanes are connected.

7. The method of claim 6, wherein said step of independently renumbering said number of connected transmit lanes further comprises:
    renumbering said connected transmit lanes based on said code, wherein a lowest physical lane number indicated by said code is renumbered to zero and wherein said connected transmit lanes are incrementally enumerated starting from zero in an order of the physical transmit lane numbers.

8. The method of claim 1, wherein said step of determining said number of connected receive lanes further comprises the step of:
    receiving, on each connected receive lane, a first training sequence carrying an identification of a respective physical transmit lane associated with another device to which said device is connected.

9. The method of claim 8, further comprising:
    storing a code which is indicative of said connected receive lanes and respective physical transmit lanes; and
    sending said code as part of a second training sequence on said first number of transmit lanes.

10. The method of claim 8, wherein said step of independently renumbering said number of connected receive lanes further comprises:
    renumbering said connected receive lanes based on said identifications of—respective physical transmit lanes, wherein a lowest physical lane number indicated by said identifications is renumbered to zero and wherein said connected transmit lanes are incrementally enumerated starting from zero in an order of the physical transmit lane numbers.

11. The method of claim 5, further comprising:
    alternating between transmitting said training sequences and wakeup sequences.

12. A device comprising:
    an interface configured to transmit and receive data toward and from lanes of an interconnect,
    said interface including a transmitter having a plurality of transmit modules and a receiver having a plurality of receive modules;
    wherein said receiver is configured to determine a first number of lanes connected thereto for data reception as part of a link startup process and to store a first lane bit code associated with said determined first number of lanes, and further wherein said transmitter is configured to transmit said first lane bit code.

13. The device of claim 12, wherein said receiver is further configured to receive a second lane bit code, said second lane bit code indicative of a second number of connected lanes via which said device transmits data over said interconnect;
    wherein said device renumbers said second number of connected lanes using said second lane bit code.

14. The device of claim 13, wherein a lowest physical lane number indicated by said second lane bit code is renumbered to zero.

15. The device of claim 12, wherein said transmitter is further configured to alternate between transmitting startup symbols and wakeup sequences on said interconnect.

16. The device of claim 12, wherein said interface includes a number of said transmit modules which is different than a number of said receive modules in said interface.

17. The device of claim 12, wherein said first number of lanes connected thereto for data reception is different than a number of receive modules in said interface.

18. The device of claim 13, wherein second number of lanes connected thereto for data transmission is different than a number of transmit modules in said interface.

19. The device of claim 12, wherein said transmit modules are configured to send a training sequence carrying an identification of a respective physical transmit lane.

20. The device of claim 12, wherein said receive modules are configured to receive a training sequence carrying an identification of a respective physical transmit lane associated with another device to which said device is connected, and wherein said receiver uses said identifications to generate said first lane bit code.

21. The device of claim 20, wherein said receiver is configured to renumber connected receive lanes based on said identifications of respective physical transmit lanes, wherein a lowest physical lane number indicated by said identifications is renumbered to zero.

22. A method for link startup of an interconnect between a first device and a second device, the method comprising:
    establishing data communication between said first device and said second device over said interconnect;
    determining a first number of connected lanes on said interconnect in a first transmit direction from said first device to said second device;
    determining a second number of connected lanes on said interconnect in a second transmit direction from said second device to said first device; and
    independently renumbering said first number of connected lanes and said second number of connected lanes.

23. The method of claim 22, wherein said first number of connected lanes is different from said second number of connected lanes.

24. The method of claim 22, wherein at least one of said first and second devices have a subset of their available physical transmit and receive lanes connected.

25. The method of claim 22, wherein said first device sends a first training sequence which carries lane identification over a first set of physical lanes.

26. The method of claim 25, wherein said second device uses said first training sequence to determine which of said first number of lanes are connected.

27. The method of claim 26, wherein said second device renumbers its connected receive lanes starting from zero.

28. The method of claim 27, wherein said second device sends a second training sequence containing a code indicating which of the first number of lanes are connected.

29. The method of claim 28, wherein said first device uses said code in said second training sequence to renumber its first number of connected lanes starting from zero.

30. The method of claim 29, wherein said first device sends a third training sequence over the first number of connected lanes.

\* \* \* \* \*